United States Patent [19]
Gorke

[11] 3,754,350
[45] Aug. 28, 1973

[54] SOUND PRODUCING ATTACHMENT FOR BICYCLES

[76] Inventor: Ronald R. Gorke, 1875 N. Barclay St., St. Paul, Minn. 55109

[22] Filed: July 10, 1972

[21] Appl. No.: 270,079

[52] U.S. Cl. ............................. 46/175 R, 46/189
[51] Int. Cl. ............................................. A63h 5/00
[58] Field of Search ........................ 46/175 R, 189

[56] References Cited
UNITED STATES PATENTS

| | | | |
|---|---|---|---|
| 2,924,043 | 2/1960 | Hewitt | 46/175 R |
| 3,559,333 | 2/1971 | Manzo | 46/175 R |
| 3,131,507 | 5/1964 | Richter | 46/175 R |
| 3,071,894 | 1/1963 | Frye | 46/175 R |
| 3,289,348 | 12/1966 | Terry | 46/175 R |

*Primary Examiner*—Russell R. Kinsey
*Assistant Examiner*—J. Q. Lever
*Attorney*—Ralph F. Merchant, Thomas M. Meshbesher et al.

[57] ABSTRACT

A megaphone-shaped attachment for bicycles constructed from a plastic material (e.g., polyethylene) and having one or more perforated wall portions bendable outwardly from the megaphone for forming a flap engageable with the rear bicycle tire to produce a noise simulating an internal combustion engine.

7 Claims, 3 Drawing Figures

SOUND PRODUCING ATTACHMENT FOR BICYCLES

BACKGROUND OF THE INVENTION

1. Field of the Invention: The present invention pertains to an attachment for bicycles for producing a noise simulating an internal combustion engine.

2. Description of the Prior Art: Numerous devices are commercially available for mounting on a bicycle frame to produce a sound simulating a gasoline engine. Typically, these devices include a member which is engageable with a wheel of the bicycle (i.e., either the tire or the spokes); the movement of this member being amplified in some manner to produce sound. In a first type of such sound producing devices, a roller member rotates with the bicycle wheel causing a piston or striking member to engage a diaphragm or percussion-like surface. See, for example, the sound producing attachments described and claimed in U. S. Pat. No. 3,559,333 and U. S. Pat. No. 3,029,553. A second type of attachment includes a resilient member positioned so as to be engageable by the spokes of the bicycle wheel and, as the wheel rotates, the resilient member oscillates striking one or more percussion surfaces producing sounds which are reinforced (i.e., amplified) by a hollow chamber. See, for example, the devices described and claimed in U. S. Pat. No. 3,267,606, U. S. Pat. No. 3,071,894 and U. S. Pat. No. 2,987,850.

While the sound producing attachments heretofore available have performed generally satisfactorily in producing a sound simulating that of an internal combustion engine, such devices have been relatively complex, expensive to manufacture, and subject to relatively rapid wear. Specifically, the devices of the type having a roller or drive member rotatable with the bicycle wheel have numerous moving parts considerably complicating the construction thereof and resulting in a device which typically does not operate properly over extended periods of usage. Similarly, the commercially available attachments which utilize a vibratory resilient member engageable with one or more percussion surfaces are subject to a highly rapid rate of wear and, for this reason, are generally undesirable.

SUMMARY OF THE INVENTION

The present invention pertains to a sound-producing attachment for a manually-driven wheeled vehicle having a frame and one or more wheels (e.g., a bicycle). Broadly, the attachment includes a hollow amplification chamber including at least one wall portion bendable outwardly from the amplification chamber; the wall portion being preferably defined by a U-shaped perforation in the amplification chamber. The attachment further includes means for securing the amplification chamber to the vehicle frame in a position adjacent a wheel thereof so that the outwardly projecting wall portion engages the wheel to produce, upon rotation of the wheel, a sound simulating an internal combustion engine. In the preferred embodiment, the amplification chamber is formed from a plastic material generally in the shape of a megaphone and includes a second perforated wall portion oppositely positioned from the first perforated wall portion. As described subsequently in the Detailed Description, the volume of sound produced by the device can be varied by selection of the wall portion engaging the vehicle wheel.

Unlike the sound producing attachments heretofore available, the present device is of a relatively simple design which is readily and inexpensively manufacturable. Furthermore, the substantial reduction in moving parts (i.e., there is only one moving part) significantly increases the useable life-span of the device. The fact that these advantageous features are accomplished without any sacrifice in the realism with which the sound produced simulates that of a motor vehicle is, of course, of great commercial importance. Other significant advantages will be appreciated from a reading of the following Detailed Description.

BRIEF DESCRIPTION OF THE DRAWINGS

Referring now to the drawings, wherein like numerals designate like elements of the invention throughout the various figures.

DETAILED DESCRIPTION OF THE PREFERRED EMBODIMENT

Figure 1:
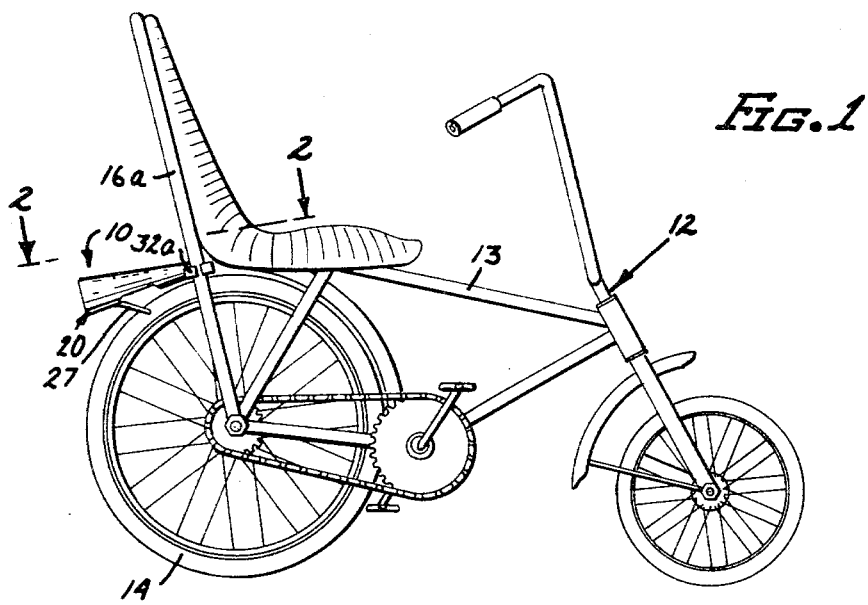
FIG. 1 is a view in side elevation showing the present sound-producing attachment affixed to a conventional bicycle.

In the drawings, the numeral 10 generally designates the sound-producing attachment as provided by the present invention. Attachment 10 is mounted on a bicycle 12 in a manner subsequently described. Bicycle 12 has a generally conventional frame 13, a spoked rear wheel 14 and a pair of row bars or sissy bars 16a and 16b extending generally vertically upward from the hub of wheel 14. The sound-producing attachment 10 is attached to the sissy bars 16a and 16b, but it can be attached to other portions of the frame; neither the positioning of attachment 10 or the design of the bicycle frame 13 is critical to the present invention.

The sound-producing attachment 10 includes a generally hollow, sound amplification member or chamber 20 in the form of a megaphone having a small open end 20a and an oppositely disposed, large open end 20b. Preferably, the sound-producing attachment 10 is mounted on frame 13 such that the large end 20b of megaphone 20 is positioned toward the rear of bicycle 12. It should be understood, however, that the design of the megaphone 20 is not critical to the present invention. For example, member 20 can be of a generally cylindrical shape with one or both ends thereof closed. Other design modifications will be apparent to the artisan. Preferably, member 20 is molded from a plastic material such as polyethylene or polyurethane utilizing conventional injection or blow molding techniques. Other materials can, of course, be utilized.

Figure 2:
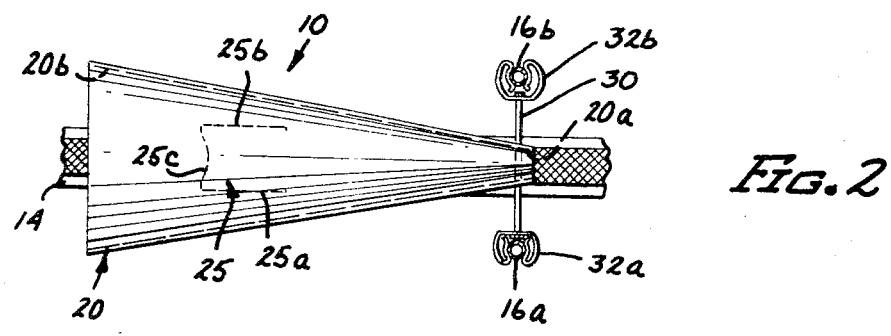
FIG. 2 is a cross-sectional view taken along the line 2—2 of FIG. 1.

The amplification chamber or megaphone 20 includes a first wall portion 25 which is bendable so as to form a flap protectable outwardly from the megaphone. As can be seen best in FIG. 2, the wall portion 25 is generally rectangularly shaped with perforations along three edges thereof; a pair of perforations 25a and 25b extending parallel to the axis of megaphone 20 and a third perforation 25c extending between perforations 25a and 25b transverse to the megaphone axis. So formed, the wall portion or flap 25 is bendable outwardly in a clock-wise direction toward the small megaphone end 20a. Preferably, the transverse perforation 25c is slightly concave to maximize the engagement thereof with the wheel 14 as subsequently described. Similarly, megaphone 20 includes a second generally rectangular-shaped wall portion 27 which is oppositely disposed from first wall portion 25. The wall portion 27 is similar in all respects to wall portion 25 with the exception that the bendable wall portion or flap 27 opens in a clockwise direction toward the larger megaphone end 25b. The perforated wall portions 25 and 27 are formed by suitable punch means or other conventional cutting apparatus simultaneous with, or subsequent to, the molding operation. It should be understood that the bendable wall portions or flaps 25 and 27 need not be perforated, but, rather can be cut entirely along three sides of the rectangular shaped flap or, for that matter, the wall of megaphone 20 simply indented or otherwise weakened along three edges of the rectangular shaped flap to allow the wall portion to be separated from megaphone 20 and bent outwardly therefrom. Thus, as used herein, the term "perforated" is intended to include all categories of cutting or indenting such that the wall portions 25 and 27 can be manually bent outwardly from the megaphone 20.

Figure 3:
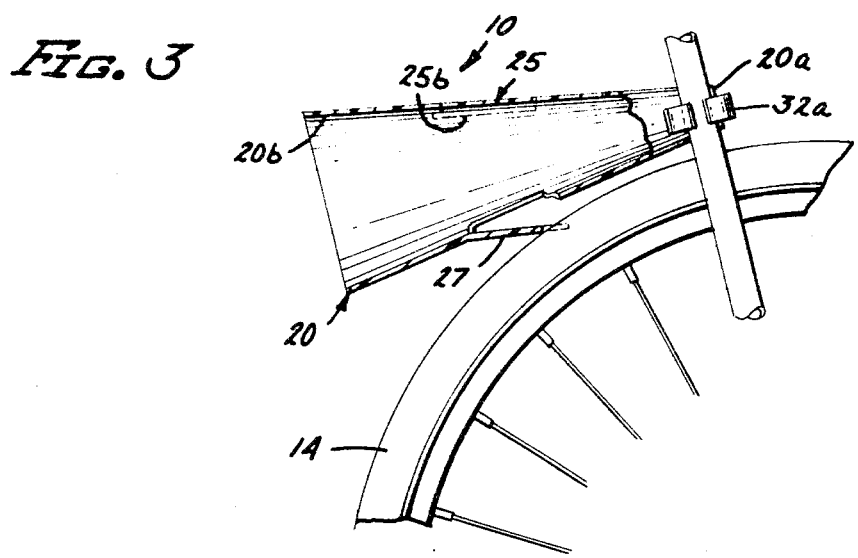
FIG. 3 is a detail view in side elevation of the present sound-producing attachment, portions thereof being broken away and shown in cross-section.

Megaphone 20 is attached to the bars 16a and 16b above wheel 14 by a rod 30 which extends transversely through the megaphone 20 adjacent the smaller megaphone end 20a and which includes a pair of C-clamps 32a and 32b at opposite ends thereof. The megaphone 20 is rotatable about rod 30. As shown, the rod 30 and smaller megaphone end 20a is secured relative to bicycle frame 13 by the engagement of C-clamps 32a and 32b with bars 16a and 16b, respectively. The larger megaphone end 20a is supported by one of the perforated wall portions 25 and 27 (e.g., perforated wall portion 27 as shown in FIGS. 1 and 3) which extend downwardly from megaphone 20 to engage the wheel 14. With the flap 27 resting on wheel 14, the rotating wheel causes the outwardly projecting flap to vibrate. These vibrations are amplified by megaphone 20 resulting in a sound realistically simulating that of an internal combustion engine.

Mounted in the manner shown, the flap 27 extends outwardly from megaphone 20 generally in the direction of rotation of tire 14. As a result, the flap 27 undergoes only small vibratory movements and the sound produced by the attachment 10 is of generally low volume. However, when the attachment 10 is mounted on frame 13 in an inverted manner (i.e., rotated 180° about its longitudinal axis), the flap 25 engages wheel 14. Since flap 25 extends outwardly from megaphone 20 in a direction generally opposite from the rotation of wheel 14, the flap 25 is caused to undergo extensive vibratory motion, upon rotation of wheel 14, producing a sound which is of relatively high volume.

As will be appreciated from the above, numerous design modifications can be readily made to the described embodiment. For instance, it is not necessary that the megaphone 20 include two oppositely disposed perforated wall portions; rather, more than two perforated wall portions can be defined by megaphone 20 or, for that matter, only a single perforated wall portion need be utilized. Additionally, the shape of the perforated wall portions 25 and 27 is generally not of a critical nature. This being the case, it is my intent to be limited solely by the spirit and scope of the appended claims.

What is claimed is:

1. In the combination of a manually driven vehicle having a frame and at least one wheel with a sound producing attachment attached to the frame of the vehicle, a sound producing attachment which comprises:
   a. wall means defining a sound amplification chamber having a large end and a relatively smaller end, said wall means including a wall portion projecting outwardly from said amplification chamber for engaging the wheel of said vehicle and for vibrating upon rotation of said wheel,
   b. means for attaching said wall means to said frame including a bar member attached to said frame and extending through said amplification chamber adjacent the smaller end thereof, said chamber being positioned above the said wheel and pivotable about said bar member.

2. Combination according to claim 1 wherein said wall portion is generally rectangularly shaped.

3. Combination according to claim 1 wherein said wall means includes first and second oppositely disposed outwardly projecting wall portions, at least one of said wall portions engaging the wheel of the vehicle to vibrate producing a sound simulating an internal combustion engine upon rotation of said wheel.

4. Combination according to claim 3 wherein one of said wall portions extends outwardly toward said relatively smaller end of the amplification chamber and the other said wall portion extends outwardly toward said large end.

5. Combination according to claim 4 wherein said wall means is formed from a plastic material to define a generally megaphone-like shape and said wall portions are positioned generally centrally along said megaphone-like shape.

6. In combination with a bicycle having a frame and a rotatable wheel,
   a. wall means defining a megaphone-shaped sound amplification member including at least one generally rectangularly shaped flap-like wall portion projecting outwardly from said wall means,
   b. means for attaching said amplification chamber to the bicycle frame generally above the wheel including a rod member attachable to the frame and extending through said amplification chamber adjacent the smaller end thereof, said amplification chamber being rotatable about said rod so that said flap-like wall portion rests on the bicycle wheel causing said flap-like wall portion to vibrate upon rotation of the wheel producing a sound simulating an internal combustion engine.

7. The combination of a bicycle with sound amplification member according to claim 6, wherein: said wall means includes first and second oppositely disposed flap-like wall portions, said first wall portion projecting outwardly toward said smaller end of said amplification chamber and said second wall portion extending outwardly toward said larger end of said amplification chamber.

* * * * *